(No Model.)
S. H. HOWLAND.
STEAM TRAP.
No. 573,658. Patented Dec. 22, 1896.
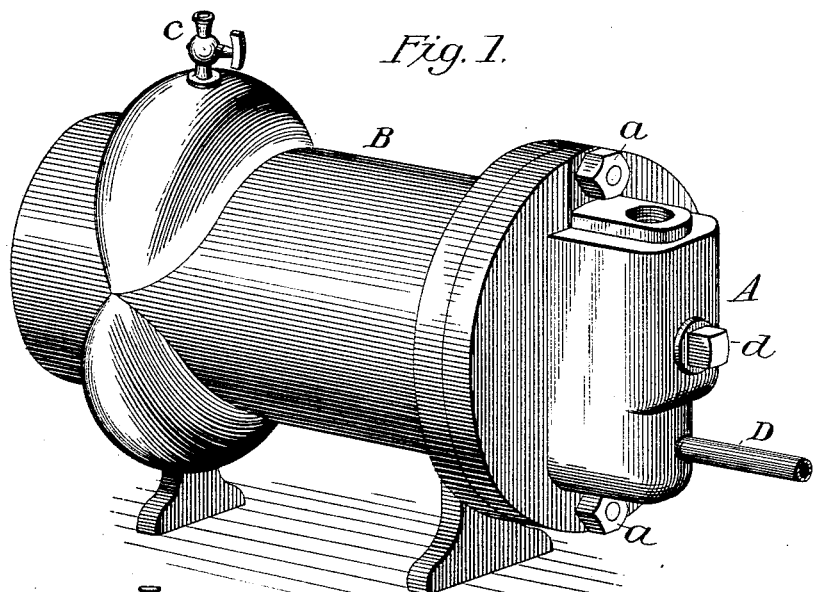
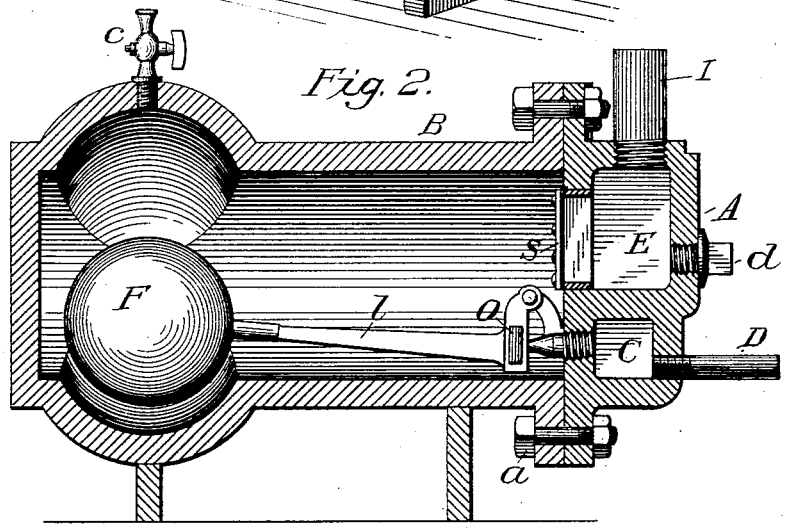
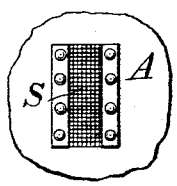
Witnesses.
A. C. Buell.
W{m} C. Buell.
Inventor.
Stephen H. Howland,
By Charles E. Buell,
Attorney.

UNITED STATES PATENT OFFICE.

STEPHEN H. HOWLAND, OF SPRINGFIELD, MASSACHUSETTS, ASSIGNOR OF ONE-HALF TO CHARLES E. BUELL, OF NORTH PLAINFIELD, NEW JERSEY.

STEAM-TRAP.

SPECIFICATION forming part of Letters Patent No. 573,658, dated December 22, 1896.

Application filed September 28, 1896. Serial No. 607,279. (No model.)

*To all whom it may concern:*

Be it known that I, STEPHEN H. HOWLAND, of Springfield, Hampden county, State of Massachusetts, have invented Improvements in Steam-Traps, of which the following is a specification.

My invention consists, primarily, in the combination, with the body of a steam-trap, of a head secured thereon in a manner to be detachable therefrom and provided with pipe connections secured to the head in a manner to adapt the said head and body to be separated without disconnecting the said pipes, substantially as hereinafter described.

My invention further consists in the combination, with the body of a steam-trap, of a head removably secured thereto that comprises an induction-port provided with a strainer and an eduction-port that consists of a chamber or enlarged part that is provided with an inlet and an outlet, the said outlet being located below the inlet, and a valve or float for automatically operating said valve, that is attached to said eduction portion, the whole arranged and operating substantially as hereinafter described.

In the accompanying drawings, Figure 1 shows a steam-trap made according to my invention, the same being an exterior view; and Fig. 2 shows the interior of the same in cross-section, side elevation. Fig. 3 shows a convenient form of strainer comprising a piece of wire-cloth secured to a metal support. The strainer thus made is readily attached in the structure shown in Fig. 2 by being soldered or screwed to the head.

A represents the head, secured to the body B by the bolts *a a*, so that the bolts can be removed and the body B be detached therefrom, leaving the float F and the head A ready for use when the body B is again attached to the head, as at first. This admits of removing the body of a steam-trap for purposes of repairs, for cleaning the parts, or to place a new body with an old head, with the advantage of not disturbing the pipe connections or the detaching of the float mechanism, so that the pipes I and D, which have become perfectly steam-tight by use, will not be disturbed, and there will be the lowest possible cost for labor in removing and replacing the body of a steam-trap.

The combining of all the threaded parts which are to receive pipes with the head of a steam-trap affords the advantage that the said threaded parts can be cast threaded at a single molding by being all in a single casting.

The head A comprises the space E for receiving the sediment and has a strainer S secured over its outlet for preventing the entrance of the sediment into the body B and is provided with a normally-closed outlet for drawing off the accumulated sediment.

The eduction comprises the pipe D and the normally-closed outlet covered by the valve O on lever *l* of float F. An enlarged portion or chamber C is formed in the head A, and the inlet thereto is placed above the outlet thereof, so that the flow of water therethrough when the float F is lifted acts to carry forward any slight deposit which might have entered the chamber through the inlet, and thereby preventing an accumulation in the eduction portion of the apparatus, and by the location of said pipes affording a seal in the eduction-port of a steam-trap.

It is obvious that the details of construction may vary without departing from my invention, it being possible to use an enlarged section of pipe between the outlet O and pipe D instead of a chamber cast in the head.

By attaching the strainer S to the head A, as shown, it is easily reached for repairs or to be replaced.

What I claim is—

1. A steam-trap comprising a head containing a receiving and a discharge chamber, a body detachably secured thereto, and a float-valve mechanism secured to said head, connections with said discharge-chamber whereby water is admitted thereinto at a point above its discharge therefrom, substantially as described.

2. In a steam-trap the combination of the following-named elements: a head provided with an inlet-chamber, a strainer between said inlet-chamber and the body of the trap, an outlet-chamber separated from said inlet-chamber, a valve mechanism secured to said head, connections with said discharge-chamber whereby water is admitted thereinto at a point above its discharge therefrom, and a body that is removably attached to said head.

3. A steam-trap comprising a head that is provided with pipe connections for an inlet-pipe, and an outlet-pipe, a float-valve mechanism secured thereto, and a body removably attached to said head, and means for securing the said body to the said head.

STEPHEN H. HOWLAND.

Witnesses:
F. E. CARPENTER,
CHARLES E. BUELL.